US008427536B2

(12) United States Patent
Jiang et al.

(10) Patent No.: US 8,427,536 B2
(45) Date of Patent: Apr. 23, 2013

(54) ORIENTATION DETERMINATION OF A MOBILE STATION USING SIDE AND TOP VIEW IMAGES

(75) Inventors: Bolan Jiang, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/622,313

(22) Filed: Nov. 19, 2009

(65) Prior Publication Data

US 2011/0115902 A1    May 19, 2011

(51) Int. Cl.
*H04N 7/18*    (2006.01)
(52) U.S. Cl.
USPC .......................... 348/135; 348/143; 348/144
(58) Field of Classification Search ........................ None
See application file for complete search history.

(56) References Cited

U.S. PATENT DOCUMENTS

| 4,179,693 | A  | * | 12/1979 | Evans et al. ..................... 342/64 |
| 7,424,133 | B2 | * | 9/2008  | Schultz et al. ................. 382/106 |
| 8,073,584 | B2 | * | 12/2011 | Marty et al. ..................... 701/28 |
| 2004/0010367 | A1 | | 1/2004 | Pollard |
| 2009/0190797 | A1 | | 7/2009 | McIntyre et al. |
| 2009/0262113 | A1 | | 10/2009 | Kotake et al. |
| 2009/0281718 | A1 | * | 11/2009 | Gibran et al. ................. 701/200 |

FOREIGN PATENT DOCUMENTS

WO    WO2008048088 A1    4/2008

OTHER PUBLICATIONS

Trinh, HH; Kim, KN; Chae, HU; and Jo, KH, "Geometrical Feature-Based Wall Region and SIFT for Building Recogntion", International Symposium on Eiectrical & Electronics Engineering 2007, pp. 74-79.
Antone, M.E. and Teller, S. "Automatic Recovery of Relative Camera Rotations for Urban Scenes", by Antone, M.E. and Teller, S. IEEE Conference on Computer Vision and Patter Recognition Proceedings, vol. 2, p. 282-289 (2000).
Gartner G et al: "Anywhere Augmentation: Towards Mobile Augmented Reality in Unprepared Environments", Lecture Notes in Geoinformation and Cartography, Springer, DE, vol. Section IV, Jan. 1, 2007, pp. 393-416, XP008114080, ISSN: 1863-2246, DOI: DOI:10.1007/978-3-540-36728-4_29 abstract the whole document.
International Search Report and Written Opinion—PCT/US2010/057501—ISA/EPO—Jun. 6, 2011.

* cited by examiner

*Primary Examiner* — John B. Walsh (57) ABSTRACT

A mobile station determines its orientation using an image of an object produced by the mobile station and a top view of that object obtained from an online server. The mobile station image is analyzed to identify lines on the object and to determine the direction of the lines with respect to the mobile station. The top view image, which may be a satellite image, is also analyzed to identify lines on the object that correspond to the lines identified in the mobile station image. The direction of the lines in the top view image are compared to the direction of lines in the mobile station image and based on their relative orientation the orientation of the mobile station may be determined. For example, the difference between the preliminary and corrected orientations may be stored as a calibration factor and used to correct subsequent orientation measurements from orientation sensors.

25 Claims, 8 Drawing Sheets

ORIENTATION DETERMINATION OF A MOBILE STATION USING SIDE AND TOP VIEW IMAGES

BACKGROUND

Multi-dimensional sensors, such as magnetometers and accelerometers, are increasingly used in mobile application for location or orientation awareness. For example, a tilt compensated digital compass may be used in applications such as pedestrian navigation. A tilt compensated digital compass includes a three-dimensional magnetometer to measure the Earth's magnetic field and a three-dimensional accelerometer for tilt compensation.

Mobile applications in which an orientation sensor may be found, e.g., such as a cellular telephone, are mass produced and, thus, the orientation sensors, if present, are generally inexpensive. Such orientation sensors, however, suffer from jitter or drift in the orientation measurement resulting in inaccurate orientation measurements. Consequently, improvements in determining orientation in a mobile application are desired.

SUMMARY

A mobile station determines its orientation using an image of an object produced by the mobile station and a top view of that object obtained from an online server. The top view of the object may be, e.g., a digital satellite image or aerial photograph. The image produced by the mobile station is analyzed to identify lines on the object and to determine the direction of the lines with respect to the mobile station. The top view image is also analyzed to identify lines on the object that correspond to the lines identified in the mobile station image. The direction of the lines in the top view image are compared to the direction of lines in the mobile station image and based on their relative orientation, the orientation of the mobile station may be determined. For example, the difference between the preliminary and corrected orientations may be stored as a calibration factor and used to correct subsequent orientation measurements from orientation sensors.

DETAILED DESCRIPTION

Figure 1:
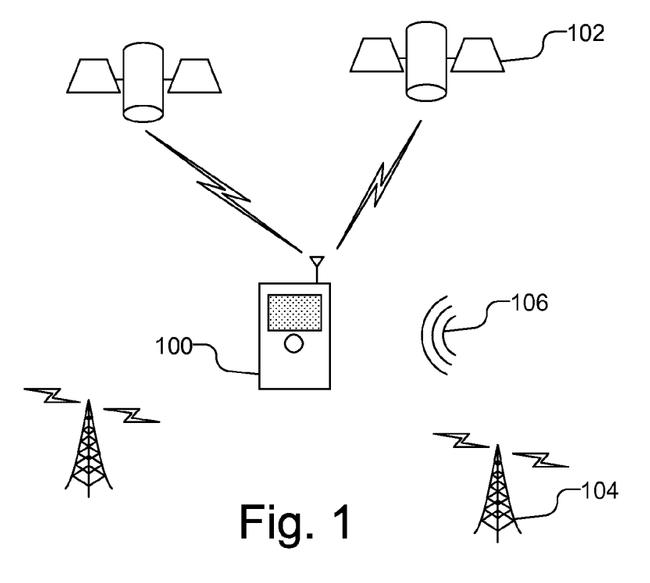
FIG. 1 illustrates a mobile station that determines its orientation using an image of an object, such as a building, that is produced by the mobile station and a top view image of the object, which may be retrieved from an online server.

FIG. 1 illustrates a mobile station 100 that determines its orientation using an image of an object produced by the mobile station 100 and a top view image of the object, such as that produced by a satellite. The top view image may be obtained from an online server, via cellular towers 104 or from wireless communication access points 106 based on the position of the mobile station determined using, e.g., a satellite positioning system (SPS), which includes satellite vehicles 102.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 102, illustrated in FIG. 1. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile station 100 is not limited to use with an SPS for position determination, as position determination techniques described herein may be implemented in conjunction with various wireless communication networks, including cellular towers 104 and from wireless communication access points 106, such as a wireless wide area network (WWAN), a wireless local area network (WLAN), a wireless personal area network (WPAN), and so on. Further the mobile station 100 may access online servers to obtain data, such as satellite images, using various wireless communication networks via cellular towers 104 and from wireless communication access points 106, or using satellite vehicles 102 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
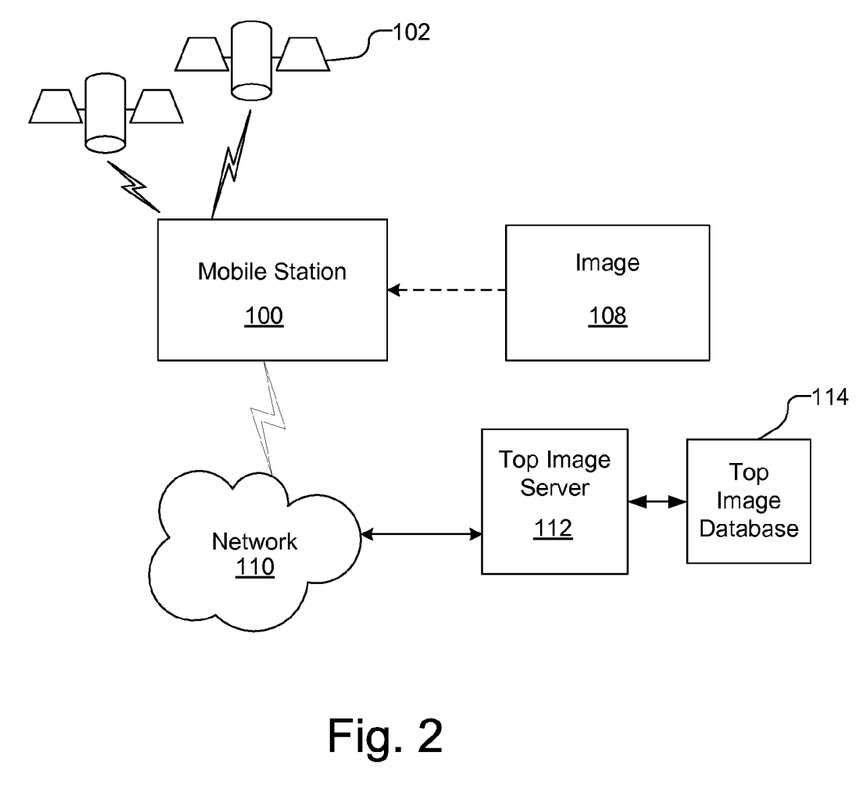
FIG. 2 illustrates a block diagram of a system in which a mobile station may determine its orientation based on images.

FIG. 2 illustrates a block diagram showing a system in which a mobile station 100 may determine its orientation based on images. As illustrated, the mobile station 100 produces an image 108 of an object, which may be a building, street or any type of object that is observable in a top view image, such as a satellite image. Additionally, the mobile station 100 determines it position at the time the image 108 is produced, e.g., using satellite vehicles 102 in an SPS. The mobile station 100 accesses a network 110, such as the Internet, e.g., via cellular tower 104 or wireless access point 106, illustrated in FIG. 1. The network 110 is coupled to a server 112, which is connected to a database 114 that stores digital top view image data, such as global satellite imagery based on Landsat 7 source data. The server 112 may be, e.g., a dedicated server with a network connection. The mobile station 100 queries the server 112 based on the position of the mobile station 100 to obtain a top view image of the position of the mobile station 100 with sufficient resolution that the object in the image 108 is resolved. It should be understood that the top view image may be, e.g., a satellite image or an image produced via aerial photography. Moreover, it should be understood that the top view image may be an image from directly overhead or at an oblique angle, e.g., approximately 45°, which is sometime referred to as bird's eye view. The mobile station 100 may then compare the image 108 to the top view image obtained from server 112 to determine the orientation of the mobile station 100 when the image 108 was produced.

Figure 3:
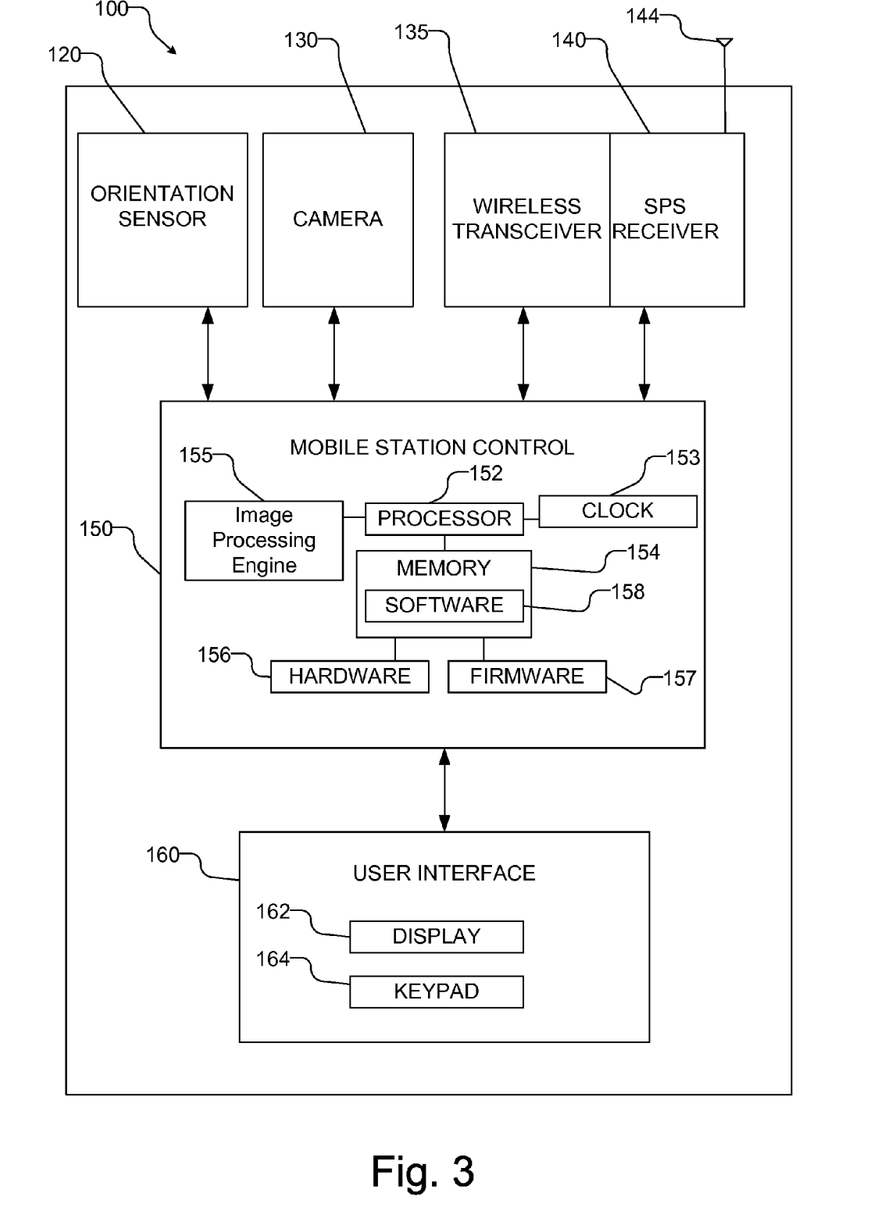
FIG. 3 is a block diagram of a mobile station that may determine its orientation based on images.

FIG. 3 is a block diagram of the mobile station 100. As illustrated in FIG. 3, the mobile station 100 may include an orientation sensor 120, which may be, e.g., a tilt corrected compass such as a magnetometer and an accelerometer or gyroscopes. The mobile station includes a camera 130, which may produce still or moving images that are displayed.

Mobile station 100 may include a receiver 140, such includes a satellite positioning system (SPS) receiver that receives signals from a SPS satellites 102 (FIG. 1) via an antenna 144. Mobile station 100 also includes a wireless transceiver 135, which may be, e.g., a cellular modem or a wireless network radio receiver/transmitter that is capable of sending and receiving communications to and from a cellular tower 104 or from a wireless access point 106, respectively, via antenna 144 (or a separate antenna). If desired, the mobile station 100 may include separate transceivers that serve as the cellular modem and the wireless network radio receiver/transmitter.

The orientation sensor 120, camera 130, SPS receiver 140, and wireless transceiver 135 are connected to and communicate with a mobile station control 150. The mobile station control 150 accepts and processes data from the orientation sensor 120, camera 130, SPS receiver 140, and wireless transceiver 135 and controls the operation of the devices. The mobile station control 150 may be provided by a processor 152 and associated memory 154, a clock 153, hardware 156, software 158, and firmware 157. The mobile station control 150 further includes an image processing engine 155, which is illustrated separately from processor 152 for clarity, but may be within the processor 152. The image processing engine 155 processes and compares the image produced by camera 130 and the top view image retrieved from the network. It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile station, and is not to be limited to any particular type of memory or number of memories, or type of media upon which memory is stored.

The mobile station 100 also includes a user interface 160 that is in communication with the mobile station control 150, e.g., the mobile station control 150 accepts data and controls the user interface 160. The user interface 160 includes a display 162 that may display images produced by the camera 130. The display 162 may further display control menus and positional information. The user interface 160 further includes a keypad 164 or other input device through which the user can input information into the mobile station 100. In one embodiment, the keypad 164 may be integrated into the display 162, such as a touch screen display. The user interface 160 may also include, e.g., a microphone and speaker, e.g., when the mobile station 100 is a cellular telephone.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 4:
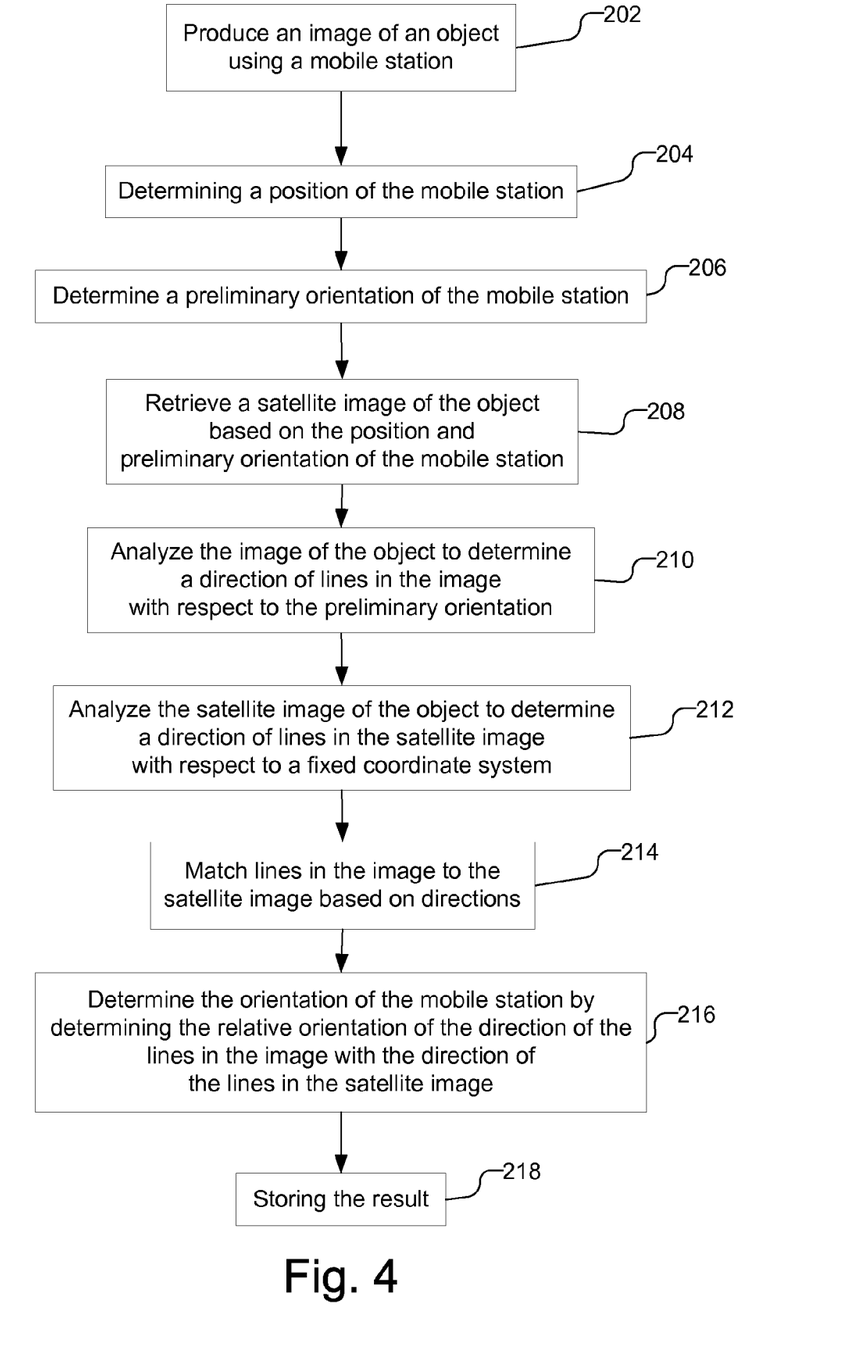
FIG. 4 is a flow chart of a method of determining the orientation of a mobile station using an image produced by the mobile station and a top view image retrieved from an online server.
Figure 5:
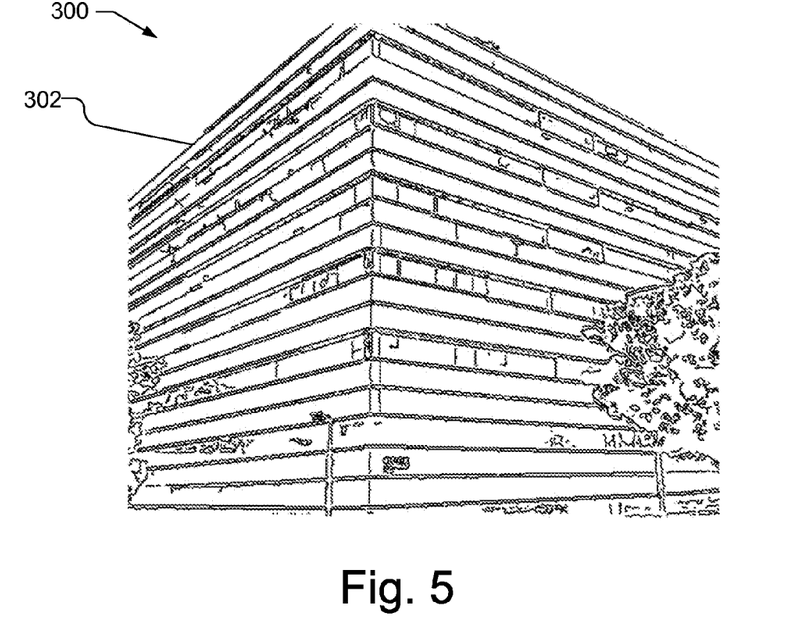
FIG. 5 illustrates an image of an object that may be produced by the mobile station and is suitable for use in the orientation determination.

FIG. 4 is a flow chart showing a method of determining the orientation of a mobile station using an image of an object produced by the mobile station and a top view image of the object. As shown in FIG. 4, the mobile station produces an image of an object (202), e.g., using the camera 130. The object that is imaged may be a structure, such as a building or street or any other type of object that is observable in a top view image. By way of example, FIG. 5 illustrates an image 300 of a building 302 that may be produced by the mobile station 100 and is suitable for use in the orientation determination. The object imaged should include edges or lines, such as those illustrated on building 302 in FIG. 5, with which the mobile station 100 can identify the orientation of the object in the image.

The position of the mobile station is determined (204) at or near the time that the image is produced. The time between the determination of position and producing the image should be minimized to reduce possible errors in the orientation determination caused by movement of the mobile station from the imaging position. The position of the mobile station may be determined using an SPS system, e.g., data from a SPS system is received by the SPS receiver 140 (FIG. 3) from which processor 152 calculates the position. If desired, the position may be determined using other techniques and devices including using data from other various wireless communication networks, including cellular towers 104 and from wireless communication access points 106.

A preliminary orientation of the mobile station 206 may be determined (206), e.g., using the orientation sensor 120, which may include a tilt corrected compass such as a magnetometer and an accelerometer or gyroscopes. The orientation sensor 120 provides orientation data to the processor 152, which calculates the preliminary orientation. Orientation sensors are generally imprecise and measurements made using these devices typically suffer from jitter and drift. Consequently, an orientation measurement produced by the orientation sensor 120 may be inaccurate and require correction. A preliminary orientation of the mobile station may alternatively be determined using images, e.g., the preliminary orientation may be based on a previous result from the present method. In yet another embodiment, the preliminary orientation of the mobile station is not determined and the top view image is obtained and analyzed without use of a preliminary orientation measurement.

Figure 6:
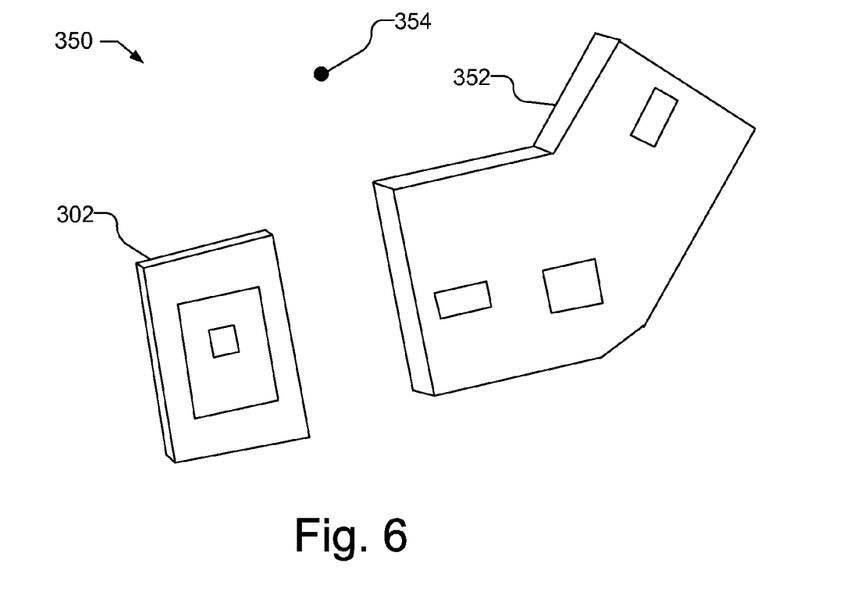
FIG. 6 illustrates a top view image of the object from FIG. 5 that may be used in the orientation determination.

A top view image of the object in the image is retrieved from server 112 and database 114 (FIG. 2) based on the position of the mobile station and in one embodiment on the preliminary orientation of the mobile station (208). For example, a server 112 is accessed through network 110, e.g., via cellular tower 104 or wireless access point 106, illustrated in FIG. 1. In some embodiments, the network 110 may be accessed through a satellite vehicle. Having determined the position of the mobile station at the time that the image was produced, the server 112 is queried based on the determined position, e.g., latitude and longitude, of the mobile station and a digital top view image at the determined position is obtained and downloaded to the mobile station with sufficient resolution that the object in the image 300 is resolved in the top view image. By way of example, a satellite image with sufficient resolution to identify lines or edges on the object may be used. With information about the preliminary orientation of the mobile station, the top view image may be retrieved from the server 112 offset towards the direction of the preliminary orientation to place the object 302 in the image 300 closer to the center of the top view image. By way of example, FIG. 6 illustrates a possible top view image 350 that includes a top view of the object, i.e., building 302, from the image 300, along with other structures and details, such as building 352.

Location 354 shown in the top view image 350 represents the determined position of the mobile station at the time the image 300 in FIG. 5, was produced.

Figure 7:
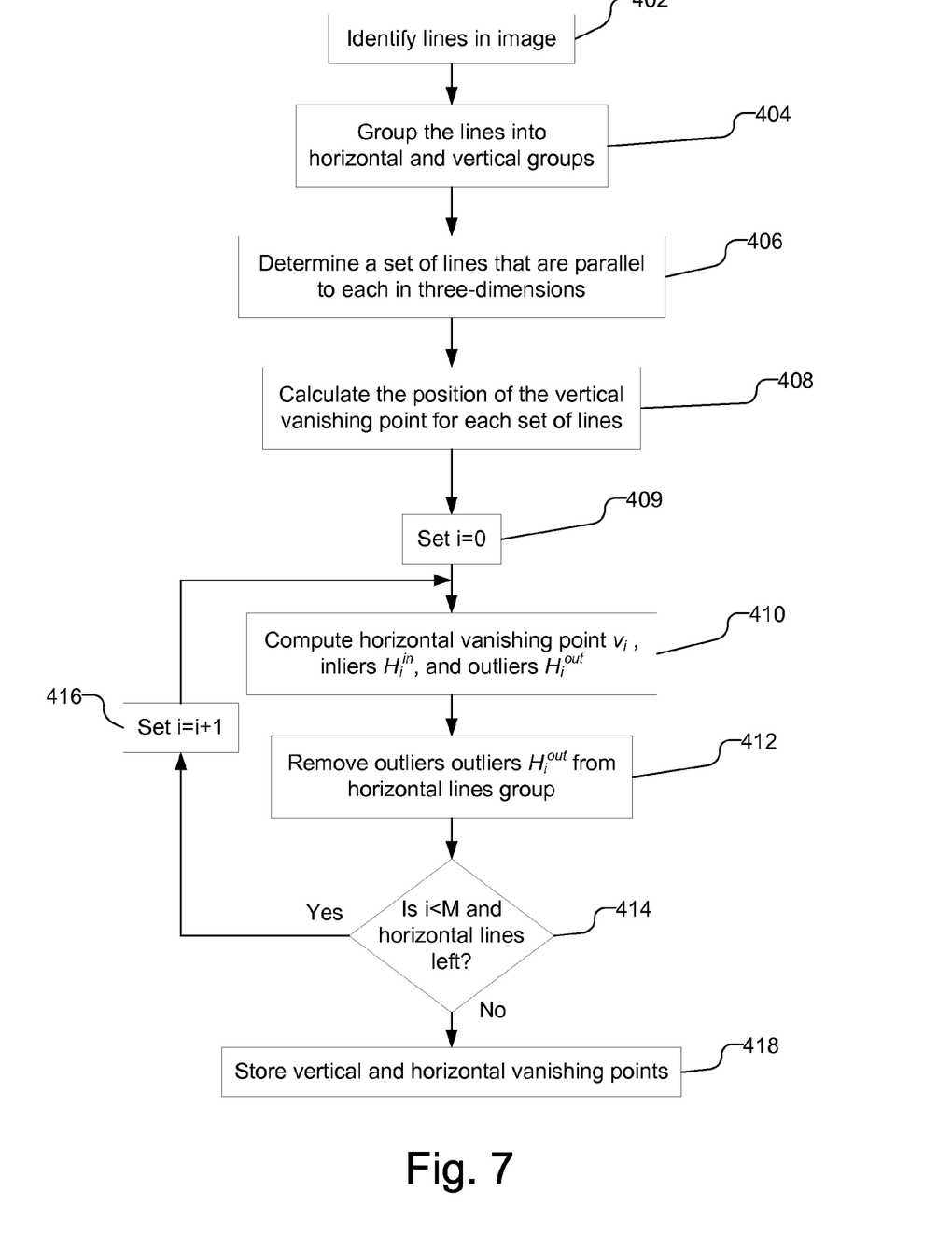
FIG. 7 is a flow chart of analyzing the image produced by the mobile station to identify lines and determine the direction of the lines.

The image 300 of the object 302 is analyzed to identify lines on the object 302 and to determine a direction of the lines (210). In one embodiment, the direction of lines on the object may be determined with respect to the preliminary orientation of the mobile station. The image 300 of the object 302 may be analyzed, e.g., by the image processing engine 155, which may be part of or separate from processor 152 (FIG. 3). Analyzing the image to identify lines on an object and to determine the direction of the lines, e.g., using a vanishing point estimation technique is discussed in "Geometrical Feature-Based Wall Region And SIFT For Building Recogntion", by H H Trinh, D N Kim, H U Chae and K H Jo, International Symposium on Electrical & Electronics Engineering 2007, pp 74-79, which is incorporated herein by reference. FIG. 7 illustrates a method of analyzing the image 300 to identify lines and determine the direction of the lines. As illustrated in FIG. 7, the lines in the image are identified (402), which may be performed using any desired edge or line detector operator, e.g., a convolution kernel, such as Canny, Sobel, or Robers Cross that detect edge pixels, which are then connected and fitted into line segments. Alternative method may be used as well such a line fitting algorithm such as a Hough transform. The lines are then grouped into horizontal and vertical groups (404). For example, if the angle between a line and the vertical axis on the image is smaller than a predetermined angle, such as 20 degrees, then the line is classified as a vertical line, and otherwise the line is classified as a horizontal line. Due to foreshortening, the image will include lines that are not parallel in the two-dimensional image, even if they are parallel in three-dimensions. Sets of vertical lines that are parallel to each other in three-dimensions are then determined (406). Lines are identified as being a parallel in three-dimensions if they pass through the same vanishing point in the two-dimensional image. For example, a vanishing point for two lines may be identified, and it is determined if other lines pass through the same vanishing point. If three or more lines pass through the same vanishing point, e.g., those lines are considered parallel. The position of the vertical vanishing point for the three-dimensionally parallel lines is calculated (408).

Figure 8:
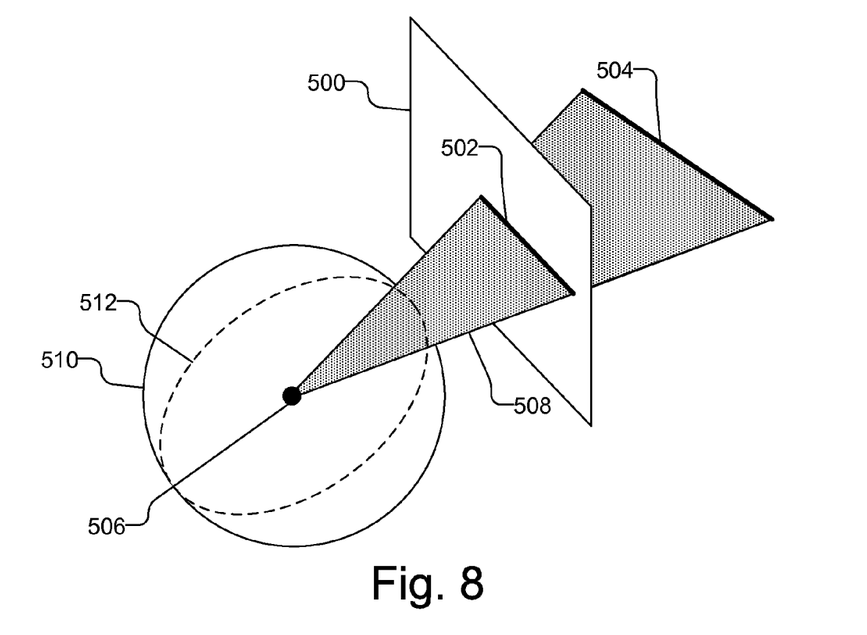
FIG. 8 illustrates the plane consisting of the camera center, a two dimensional line from an image and the corresponding three dimensional line.
Figure 9:
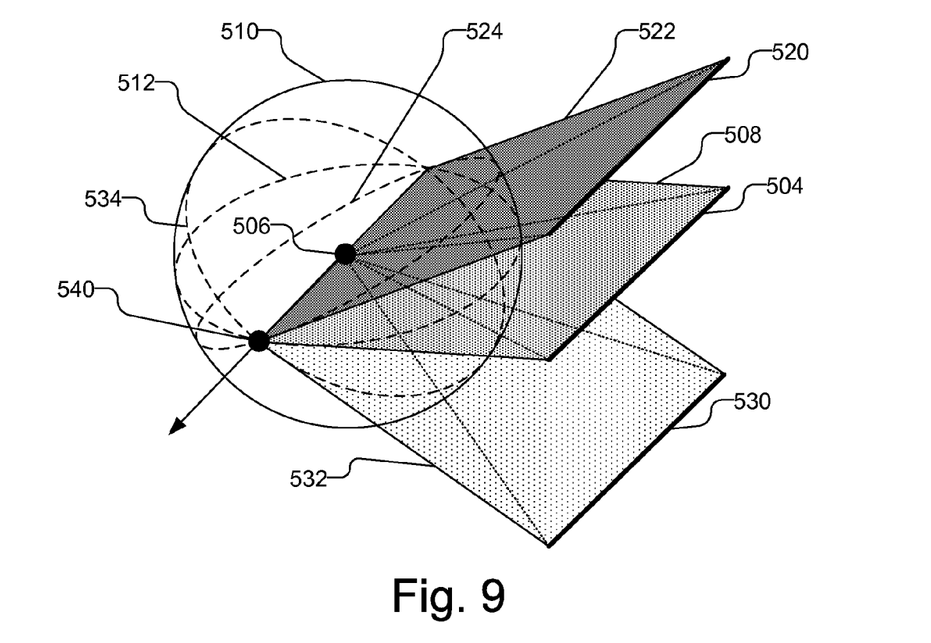
FIG. 9 illustrates the determination of a vanishing point based on the intersection of the planes formed by parallel three dimensional lines.

FIGS. 8 and 9 illustrate the determination of a vanishing point. FIG. 8 illustrates a plane 508 formed by the camera position 506, a two dimensional line 502 in an image 500 and the corresponding line 504 in three-dimensional space. A Gaussian (unit) sphere 510 is illustrated centered on the camera position 506, and the plane 508 intersects the Gaussian sphere 510 on a great circle 512. FIG. 9 illustrates the plane 508 formed by line 504 in three-dimensional space and the camera position 506 along with the Gaussian sphere 510 and the corresponding great circle 512. FIG. 9 also shows two additional lines 520 and 530 that are parallel to line 504 in three dimensional space, along with the planes 522 and 532 formed by the respective lines 520 and 526 and the camera position 506 and the corresponding great circles 524 and 534. The great circles 512, 524 and 534 intersect at a common vanishing point 540 on the Gaussian sphere 510, which can be used to identify the direction for the parallel lines 504, 520, and 530. Given a set of n lines that are parallel to each other in three-dimensional space, the vanishing point V is determined by solving the following equation:

$$l_i^T V_i = 0 \quad \text{Eq. 1}$$

where $l_i = (a_i, b_i, c_i)$ represents the ith line. A method, such as RANSAC (RANdom SAmple Consensus) may be used to estimate the vertical vanishing point. It should be understood that the described vanishing point estimation method may be used when the image is produced by a roughly upright camera. If desired, other known vanishing point estimation methods may be used.

For vertical lines, there is only one vanishing point to determine, thus, equation 1, needs to be solved only once. For horizontal lines, however, multiple vanishing points are possible. To determine horizontal vanishing points, i is set to 0 (409) and the RANSAC method is used to compute the vanishing point $v_i$, the inliers $H_i^{in}$ and the outliers $H_i^{out}$ (410). The outliers $H_i^{out}$ are removed from the horizontal lines group (412). If i<M and there are more than six horizontal lines left (414), i is increased by one (416) and the process is repeated. If i is not less than M, or if there are no more than six horizontal lines left (414), the process ends and the vertical and horizontal vanishing points are stored 418, e.g., in memory 154 (FIG. 3). By way of example, the value M may be set at 5 or at any other desired value for the number of horizontal vanishing points to be used.

Figure 10:
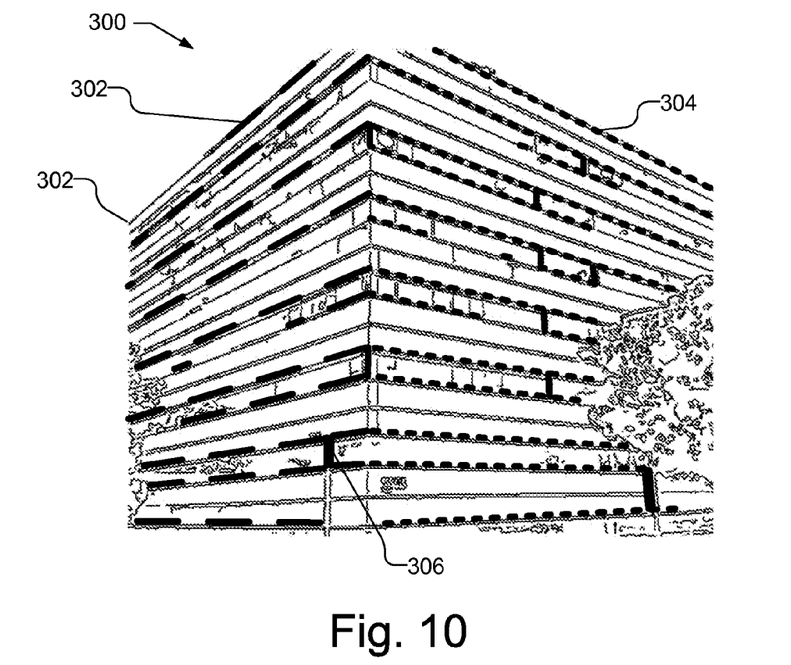
FIG. 10 illustrates the image from FIG. 5 overlaid with identified lines.
Figure 11:
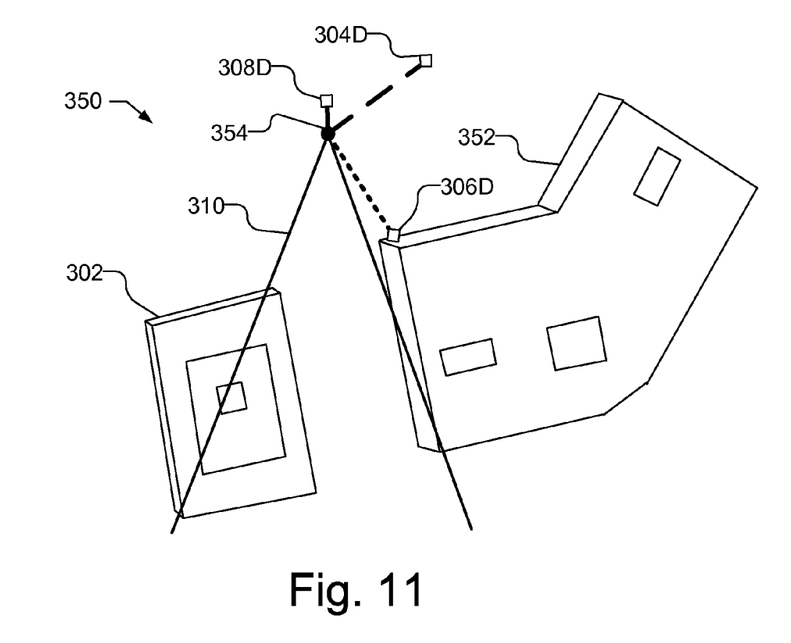
FIG. 11 illustrates the top view image from FIG. 6 with the direction of the lines from FIG. 10 illustrated along with a preliminary orientation of the mobile station shown as the a field of view of the camera.

FIG. 10, by way of example, illustrates image 300 with building 302, with lines identified and included in a first set of horizontal lines 304, a second set of horizontal lines 306 and a set of vertical lines 308. FIG. 11 illustrates the top view image 350 with the direction 304D of the first set of horizontal lines 304, the direction 306D of the second set of horizontal lines 306 and the direction 308D of the vertical lines 308 illustrated with respect to the position of the camera 354 along with the preliminary orientation of the camera, which is illustrated as the field of view 310 of the camera.

Referring back to FIG. 4, the top view image 350 of the object 302 is analyzed to identify lines or edges and to determine the direction of the lines with respect to the known and fixed coordinate system of the top view image (212). The lines in the top view image 350 may be identified in the same manner as described above, e.g., using an edge or line detector operator, such as a convolution kernel, the Robers Cross, Sobel, or Canny edge detectors. The object to be analyzed in the top view image 350 may be identified as the object that is within the field of view 310 of the camera, i.e., closest to the determined preliminary orientation of the mobile station. If a preliminary orientation for the mobile station is not determined, all objects within the top view image may be analyzed to identify the directions of the lines on the object.

Figure 12:
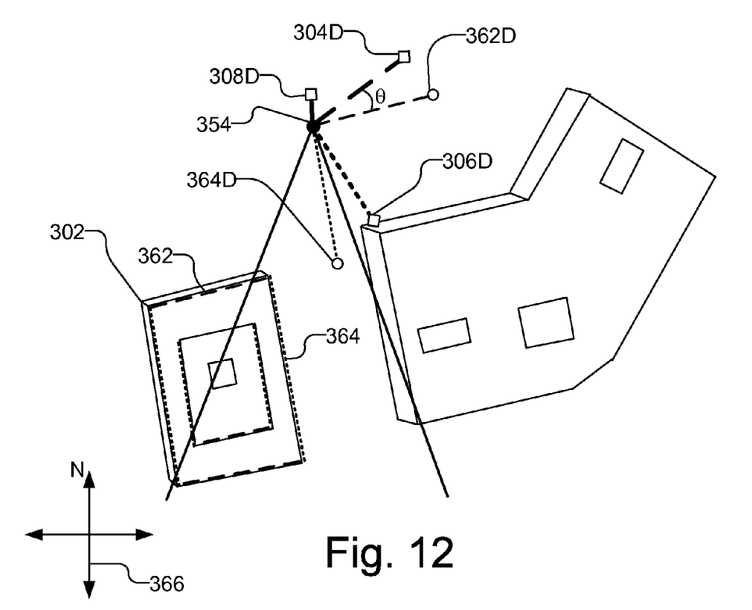
FIG. 12 illustrates the top view image from FIG. 11 with the detected edges of the object identified and the direction of the edges illustrated.

FIG. 12, is similar to FIG. 11, and illustrates the top view image 350 with the detected edges of the top of building 302 identified. As can be seen, two sets of lines 362 and 364 are shown with respect to building 302. The direction of the lines 362 and 364 with respect to a known and fixed coordinate system 366 of the top view image 350 is determined. There may be additional lines identified in the top view image 350 and, thus, lines in the top view image 350 are matched to lines in the image 300 based on the directions of the lines (210) (FIG. 4). In one embodiment, the matching of lines is performed by comparing the angles between lines in the top view image 350 with the angle between the directions 304D and 306D, where the smallest difference is considered a match. This process is simplified if the preliminary orientation of the mobile station is known, otherwise a more rigorous process of matching sets of lines may be used. The directions 362D, and 364D of the top view image lines 362 and 364, respectively, is illustrated in FIG. 12 with respect to the position of the camera 354.

The relative orientation of the direction of the lines in the image 300 with respect to the direction of the lines in the top view image is determined and used to determine the orientation of the mobile station (216), e.g., by correcting the preliminary orientation. As can be seen in FIG. 12, an angle θ exists between the lines 304D and 362D. The result, including the determined orientation and/or the calibration factor for correcting the preliminary orientation of the mobile station is stored (218) (FIG. 4), e.g., in memory 154 (FIG. 3). The relative orientation may be determined by solving the following to determine the quaternion q:

$$\min_q \|[A_1, \ldots, A_m]^T q\|^2 \qquad \text{Eq. 2}$$

where $A_j$ is defined as:

$$A_j = \begin{bmatrix} 0 & -s_{jx} & -s_{jy} & -s_{jz} \\ s_{jx} & 0 & a_{jz} & a_{jy} \\ s_{jy} & -a_{jz} & 0 & a_{jx} \\ s_{jz} & -a_{jy} & -a_{jx} & 0 \end{bmatrix} \qquad \text{Eq. 3}$$

and where $s_j = v_i - d_i$ and $a_j = v_i + d_i$ and $v_i$ is defined the direction of the lines that interest on the ith vanishing point on the image 300, and $d_i$ is defined the direction of the lines detected on the top view image 350 as discussed in "Automatic Recovery of Relative Camera Rotations for Urban Scenes", by Antone, M. E. and Teller, S, IEEE Conference on Computer Vision and Patter Recognition Proceedings, Vol. 2, p. 282-289 (2000), which is incorporated herein by reference.

Figure 13:
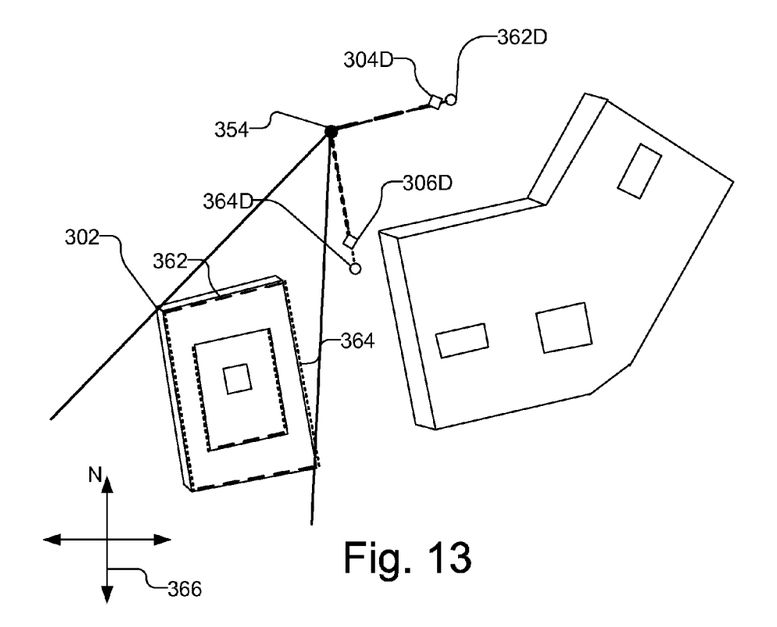
FIG. 13 illustrates the top view image from FIG. 11 with the direction of the lines from FIG. 10 rotated to match the direction of the edges from FIG. 12, thereby correcting the preliminary orientation of the mobile station.

FIG. 13, by way of example, illustrates the top view image 350 and is similar to FIG. 12, but shows the directions 304D and 306D of lines 304 and 306 rotated to match the directions 362D and 364D. Using this rotation as the calibration factor, the preliminary orientation of the mobile station is corrected.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    generating an image of an object using a camera in a mobile station and providing the image to a computer, wherein the image is not a top view of the object;
    determining a position of the mobile station;
    retrieving a top view image of the object based on the position and providing the top view image to the computer;
    analyzing the image of the object with the computer to determine a direction of lines in the image of the object;
    analyzing the top view image with the computer to determine a direction of lines in the top view image of the object with respect to a fixed coordinate system; and
    determining an orientation of the mobile station with the computer based on matching the direction of lines in the image of the object with the direction of the lines in the top view image of the object;
    storing the determined orientation of the mobile station.

2. The method of claim 1, further comprising determining a preliminary orientation of the mobile station, wherein analyzing the top view image with the computer comprises identifying lines in the top view image based on the preliminary orientation and wherein determining the orientation of the mobile station comprises correcting the preliminary orientation.

3. The method of claim 2, wherein the preliminary orientation of the mobile station is determined using at least one of a magnetometer, an accelerometer, and a gyroscope.

4. The method of claim 2, wherein the preliminary orientation of the mobile station is determined using a previous image generated by the mobile station.

5. The method of claim 2, wherein the direction of lines in the image of the object are with respect to the preliminary orientation and wherein correcting the preliminary orientation comprises:
    calculating a relative orientation of the direction of the lines in the image of the object and the direction of lines in the top view image; and
    correcting the preliminary orientation using the relative orientation.

6. The method of claim 1, wherein analyzing the image of the object with the computer to determine a direction of lines in the image of the object comprises:
    detecting lines in the image of the object that have a same direction in three-dimensional space; and
    using a vanishing point of the detected lines to determine the direction of the lines.

7. The method of claim 6 wherein detecting lines in the image of the object that have the same direction in three-dimensional space comprises identifying a plurality of lines that extend through the same vanishing point.

8. The method of claim 1, wherein the top view image of the object is one of a satellite image and an aerial photograph.

9. A mobile station comprising:
    a satellite positioning system receiver that provides positioning data;
    a camera that produces an image;
    a wireless transceiver;
    a processor connected to the satellite positioning system receiver to receive the positioning data, the processor being connected to the camera to receive the image, and the processor being connected to the wireless transceiver;
    memory connected to the processor; and
    software held in the memory and run in the processor to determine a position of the mobile station based on the positioning data; the software further causes the processor to analyze the image from the camera to detect lines on an object in the image, wherein the image is not a top view of the object; the software further causes the processor to control the wireless transceiver to obtain a top view image of the object based on the position of the mobile station; the software further causes the processor to analyze the top view image to detect lines of the object in the top view image; the software further causes the processor to determine an orientation of the mobile station based on matching a direction of lines in the image of the object with a direction of the lines in the top view image of the object.

10. The mobile station of claim 9, the mobile station further comprising a orientation sensor coupled to provide orientation data to the processor, wherein the software causes the processor to determine a preliminary orientation based on the orientation data, and wherein the software that causes the processor to analyze the top view image to detect the lines of the object comprises software that causes the processor to identify lines top view image based on the preliminary orientation.

11. The mobile station of claim 10, wherein the orientation sensor is at least one of a magnetometer, an accelerometer, and a gyroscope.

12. The mobile station of claim 10, wherein the direction of lines on the object in the image is with respect to the preliminary orientation, and wherein the software that causes the processor to determine the orientation of the mobile station comprises software that causes the processor to calculate a relative orientation of the direction of the lines in the image of the object with respect to the direction of lines in the top view image and to correct the preliminary orientation using the relative orientation to determine the orientation of the mobile station.

13. The mobile station of claim 9, wherein the software that causes the processor to analyze the image from the camera to detect the lines on the object in the image comprises software that causes the processor to detect the lines on the object in the image that have a same direction in three dimensional space and to use a vanishing point of the detected lines to determine the direction of the lines.

14. The mobile station of claim 13, wherein the software that causes the processor to the detect lines on the object in the image that have the same direction in three dimensional space causes the processor to identify a plurality of lines that extend through the same vanishing point.

15. A system for correcting an orientation of a mobile station, the system comprising:
    means for generating an image of an object using the mobile station, wherein the image is not a top view of the object;
    means for determining a position of the mobile station;
    means for retrieving a top view image of the object based on the position;
    means for analyzing the image of the object to determine a direction of lines in the image of the object;
    means for analyzing the top view image to determine a direction of lines in the top view image of the object with respect to a fixed coordinate system; and
    means for determining the orientation of the mobile station based on matching the direction of the lines in the image of the object with the direction of the lines in the top view image of the object.

16. The system of claim 15, further comprising a means for determining a preliminary orientation of the mobile station, wherein the means for analyzing the top view image comprises means for identifying lines in the top view image based on the preliminary orientation and wherein the means for determining the orientation of the mobile station corrects the preliminary orientation based on matching the direction of lines in the image of the object with the direction of the lines in the top view image of the object.

17. The system of claim 16, wherein the means for determining the preliminary orientation of the mobile station comprises at least one of a magnetometer, an accelerometer, and a gyroscope.

18. The system of claim 16, wherein the means for determining the preliminary orientation of the mobile station uses a previous image generated by the means for generating the image.

19. The system of claim 16, wherein the direction of lines in the image of the object are with respect to the preliminary orientation and wherein the means for determining the orientation of the mobile station corrects the preliminary orientation comprises:
    means for calculating a relative orientation of the direction of the lines in the image of the object and the direction of lines in the top view image; and
    means for correcting the preliminary orientation using the relative orientation.

20. The system of claim 15, wherein the means for analyzing the image of the object to determine a direction of lines in the image of the object comprises:
    means for detecting lines in the image of the object that have a same direction in three-dimensional space; and
    means for using a vanishing point of the detected lines to determine the direction of the lines.

21. The system of claim 20, wherein the means for detecting lines in the image of the object that have the same direction in three-dimensional space comprises means for identifying a plurality of lines that extend through the same point in the image.

22. A non-transitory computer-readable medium including program code stored thereon, comprising:
    program code to determine a position of a mobile station;
    program code to analyze an image to detect lines on an object in the image, wherein the image is not a top view of the object;
    program code to control a wireless transceiver to obtain a top view image of the object based on the position of the mobile station;
    program code to analyze the top view image to detect lines of the object in the top view image;
    program code to determine an orientation of the mobile station based on matching a direction of the lines in the image of the object with a direction of the lines in the top view image of the object.

23. The non-transitory computer-readable medium of claim 22, further comprising program code to determine a preliminary orientation of the mobile station, wherein the program code to determine an orientation of the mobile station corrects the preliminary orientation based on matching the direction of lines in the image of the object with the direction of the lines in the top view image of the object.

24. The non-transitory computer-readable medium of claim 22, wherein the program code to analyze the image further comprises program code to detect lines on the object in the image that have a same direction in three dimensional space and to use a vanishing point of the detected lines to determine the direction of the lines.

25. The non-transitory computer-readable medium of claim 24, wherein the program code to the detect lines on the object in the image further comprises program code to identify a plurality of lines that extend through the same vanishing point.

* * * * *